(12) United States Patent
Zätterqvist

(10) Patent No.: US 7,600,477 B2
(45) Date of Patent: Oct. 13, 2009

(54) METHOD FOR DISCHARGING COUNTERMEASURE MEANS, ROCKET LAUNCHER, AND DISPENSER ARRANGEMENT

(75) Inventor: Christer Zätterqvist, Uppsala (SE)

(73) Assignee: SAAB AB, Linköping (SE)

( * ) Notice: Subject to any disclaimer, the term of this patent is extended or adjusted under 35 U.S.C. 154(b) by 63 days.

(21) Appl. No.: 10/476,757

(22) PCT Filed: May 3, 2002

(86) PCT No.: PCT/SE02/00850

§ 371 (c)(1),
(2), (4) Date: May 19, 2004

(87) PCT Pub. No.: WO02/090867

PCT Pub. Date: Nov. 14, 2002

(65) Prior Publication Data

US 2004/0200381 A1    Oct. 14, 2004

(30) Foreign Application Priority Data

May 7, 2001    (SE)    .................................... 0101581

(51) Int. Cl.
*F42B 14/06*    (2006.01)
(52) U.S. Cl. ...................................... 102/505; 89/1.816
(58) Field of Classification Search ......... 102/501–505; 89/1.51, 1.816
See application file for complete search history.

(56) References Cited

U.S. PATENT DOCUMENTS

| | | | | |
|---|---|---|---|---|
| 3,808,941 A | * | 5/1974 | Biggs | ........................ 89/1.51 |
| 4,307,665 A | * | 12/1981 | Block et al. | ................. 102/505 |
| 4,417,709 A | * | 11/1983 | Fehrm | ........................ 244/136 |
| 4,586,439 A | | 5/1986 | Wrana | |
| 4,650,092 A | | 3/1987 | Andersson et al. | |
| 4,941,392 A | | 7/1990 | Huetter | |
| 5,381,721 A | | 1/1995 | Holmstrom et al. | |
| 5,400,690 A | * | 3/1995 | Meili et al. | ................. 89/1.816 |
| 5,411,225 A | * | 5/1995 | Lannon et al. | ........... 244/137.1 |
| 5,461,960 A | * | 10/1995 | Marks et al. | .................. 89/1.51 |
| 5,915,694 A | * | 6/1999 | Brum | ......................... 273/359 |

(Continued)

FOREIGN PATENT DOCUMENTS

DE    2522927 B1    11/1976

(Continued)

OTHER PUBLICATIONS

Hammer, Wikipedia the free encyclopedia (http://www.en.wikipedia.org/wiki.Hammer), retrieved Jun. 5, 2007.*

(Continued)

*Primary Examiner*—Troy Chambers
(74) *Attorney, Agent, or Firm*—Venable LLP; Eric J. Franklin

(57) ABSTRACT

A method for discharging countermeasures, a rocket launcher, and a dispenser arrangement. A space for one or more rockets in a rocket launcher is used as a carrier for a dispenser arrangement for countermeasures. The dispenser arrangement is designed with one or more cylindrical sections specially adapted to the rocket space in the rocket launcher. Equipment already adapted to aircraft can be used in supplementing the countermeasure equipment of the aircraft.

6 Claims, 2 Drawing Sheets

U.S. PATENT DOCUMENTS

| | | | | |
|---|---|---|---|---|
| 6,510,798 B2 * | 1/2003 | Brum | ............... | 102/505 |
| 2004/0200381 A1 * | 10/2004 | Zatterqvist | ............... | 102/505 |
| 2004/0200382 A1 * | 10/2004 | Zatterqvist et al. | ............... | 102/505 |

FOREIGN PATENT DOCUMENTS

| | | | |
|---|---|---|---|
| GB | 2079724 A | * | 1/1982 |
| GB | 2300036 A | | 10/1996 |
| GB | 2353087 A | | 2/2001 |
| SE | 446771 B | | 10/1986 |
| SE | 469196 B | | 5/1993 |

OTHER PUBLICATIONS

Photograph of Squirt Bottle, (http://www.harrisonburg,k12.va.us/water/1-resources/simple-machines/mini-pix/squirt-bottle-top.jpg), retrieved Jun. 5, 2007.*

* cited by examiner

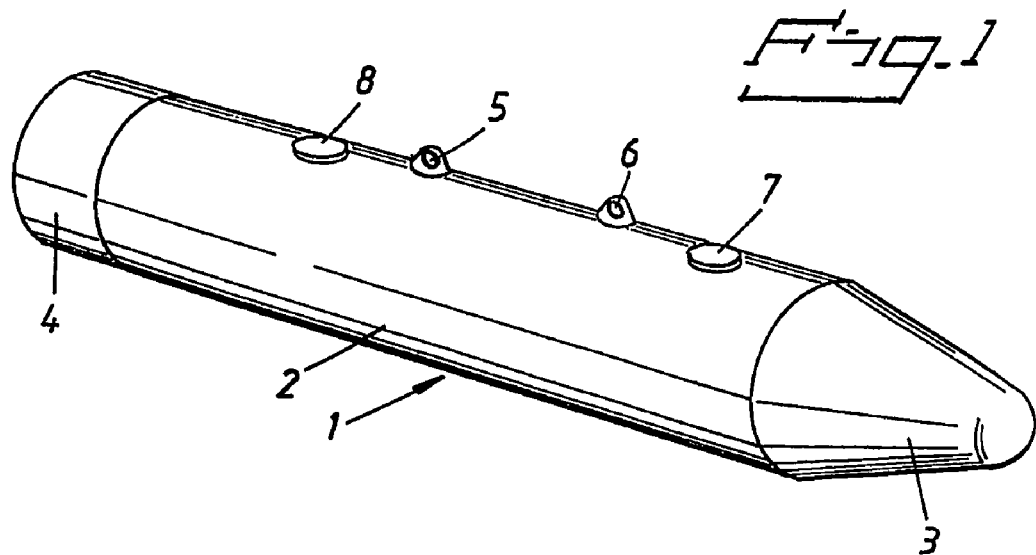
*Prior Art*
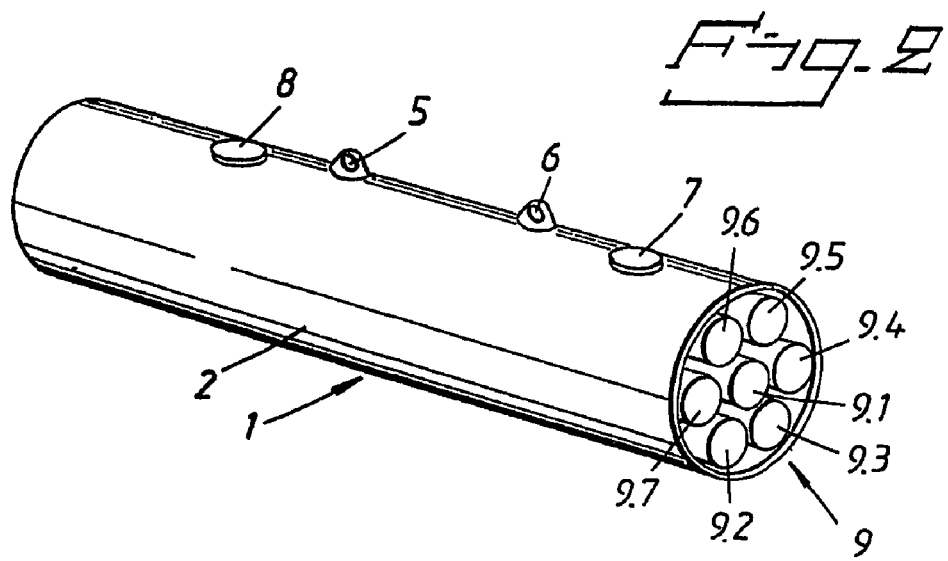
*Prior Art*

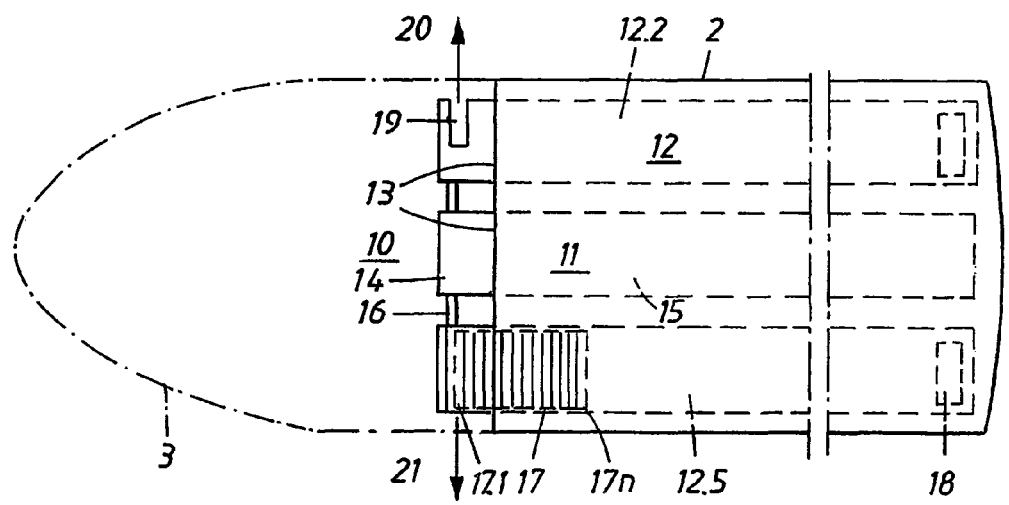
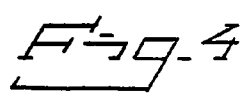
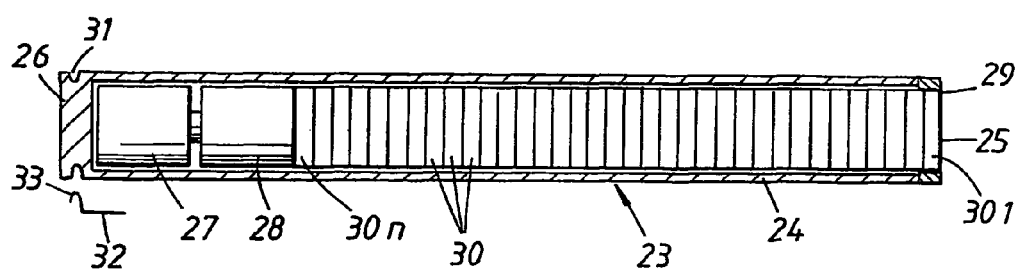

METHOD FOR DISCHARGING COUNTERMEASURE MEANS, ROCKET LAUNCHER, AND DISPENSER ARRANGEMENT

CROSS-REFERENCE TO RELATED APPLICATIONS

This application claims priority to Swedish patent application 0101581-7 filed 7 May 2001 and is the national phase under 35 U.S.C. § 371 of PCT/SE02/00850.

FIELD OF THE INVENTION

The present invention relates to a method for discharging countermeasure means, such as radar chaff or heat-generating bodies, from an electromechanical dispenser arrangement. The invention also relates to a rocket launcher comprising cylindrical spaces, and a dispenser arrangement for discharging countermeasure means, such as radar chaff or heat-generating bodies.

BACKGROUND OF THE INVENTION

On the market, a large number of rocket launchers are in service around the world. In the context of, inter alia, aircraft, it is important that the load which the aircraft is to carry is adapted to the aircraft as far as, inter alia, shape, weight and positioning are concerned. A large number of types of aircraft today carry rocket launchers which have been tested for the aircraft type. In order to protect aircraft, they are provided with equipment for dispensing countermeasure means. An example of such equipment is the BOL dispenser produced and patented by ourselves. In this connection, reference may be made to our U.S. Pat. Nos. 4,417,709 and 4,650,092. By means of this type of dispenser, the dispensing of countermeasure means can be simply controlled and adapted to the threat situation existing at the time. The shape and temperature of a countermeasure-generated target can be decisive factors for its effect. Our dispenser is of electromechanical type. So as not to occupy weapon-carrying locations, the dispenser can be designed to serve as a mounting for other load at the same time.

Heat-generating bodies mean what is known as hot chaff, that is to say chaff which undergoes an increase in temperature in connection with leaving the dispenser.

There is a clear desire in the marketplace to introduce controllable dispenser arrangements. At the same time, great efforts are necessary in order to adapt the dispenser arrangements to the various aircraft in service.

SUMMARY OF THE INVENTION

The object of the present invention is to propose a concept which makes upgrading of dispenser equipment in existing aircraft types easier and more cost-effective.

The object of the invention is achieved by means of a method characterized in that at least parts of the space for rockets in a rocket launcher are used as a carrier for one or more countermeasure dispensers. The object of the invention is likewise achieved by means of a rocket launcher characterized in that one or more of the cylindrical spaces of the rocket launcher is or are arranged so as to accommodate countermeasure ammunition, such as radar chaff or heat-generating bodies, and in that one or more of the cylindrical spaces of the rocket launcher comprise(s) equipment for discharging countermeasure ammunition through a discharging opening for each cylindrical space with countermeasure ammunition, and also a dispenser arrangement characterized in that at least the main part of the dispenser is designed to be accommodated in and secured in one or more cylindrical spaces for rockets in a rocket launcher. By adapting the dispenser arrangement to the spaces of a rocket launcher, no new weapon locations are necessary in order to carry dispenser arrangements, and testing can be limited as use is made of equipment, in the form a rocket launcher, which has already been tested and is already carried. The dispenser arrangement utilizes the geometry of existing rocket dispensers in order to bring about electrical and mechanical connection to the aircraft.

In this context, it may be noted that it is in principle previously known to dispense countermeasure means using rockets. What we are doing is replacing rockets which are discharged when activated with dispenser arrangements which remain in the rocket launcher at least during the time the dispenser is in operation.

The discharging openings of the rocket launcher are advantageously covered by a removable protective nose portion. The nose portion protects the contents of the rocket launcher before activation and contributes to favourable air flows past the rocket launcher.

It is suitable to retain the original capacity of the rocket launcher for firing rockets. The rocket launcher is therefore preferably designed so as to comprise equipment for firing rockets from all the cylindrical spaces of the rocket launcher. Such a design gives the rocket launcher the maximum possible flexibility.

According to an advantageous embodiment, the dispenser arrangement is designed so as mainly to be accommodated in a cylindrical rocket space. In this connection, the dispenser arrangement is more specifically characterized in that the dispenser arrangement is designed with an oblong outer casing with a cylindrical lateral surface which essentially coincides with the lateral surface of the cylindrical space of the rocket launcher, which oblong outer casing ends in an opening at one end for discharging ammunition in the form of countermeasure means, the other end preferably being closed, and in that the oblong outer casing contains a space for countermeasure ammunition and a discharging mechanism with an ammunition-advancing device and an ammunition-separating device for discharging countermeasure means depending on discharging instructions supplied. The embodiment means that there is great freedom of choice as far as occupying the rocket spaces is concerned. If the requirement is small, it is possible to opt to use only one of the rocket spaces of the rocket launcher for accommodating a dispenser arrangement and to allow the other rocket spaces to be used for rockets. For a large requirement, in principle the whole rocket launcher can be used for carrying dispenser arrangements with countermeasure means.

In the dispenser arrangement according to the preceding paragraph, the other end of the oblong outer casing is advantageously provided with a recess for engagement with a locking mechanism in the rocket launcher. The embodiment requires no adaptation of the locking mechanisms of existing rocket launchers.

According to another advantageous embodiment, the dispenser arrangement is designed to be accommodated in at least two cylindrical rocket spaces, and in this connection the dispenser arrangement comprises at least one cylindrical section with countermeasure ammunition and an ammunition-advancing device and at least one cylindrical section with an ammunition-separating device. By locating the ammunition-separating device in a separate section, greater space for countermeasure ammunition can be reserved per cylindrical section, and the ammunition-separating device can moreover act on a number of sections with countermeasure ammunition. A more specific characteristic of this embodiment is that the ammunition-separating device is common to a number of cylindrical sections with countermeasure ammunition.

According to a development of the embodiment according to the preceding paragraph, in a case where the cylindrical sections are designed with a central section surrounded by a number of peripheral cylindrical sections, the common ammunition-separating device is accommodated essentially in the central section, and the countermeasure ammunition and ammunition-advancing devices are accommodated essentially in the surrounding cylindrical sections. The central positioning of the ammunition-separating device means that the device has sections with countermeasure ammunition within close reach all the way around and that it can be designed symmetrically.

In order to secure the dispenser arrangement in the rocket launcher, the cylindrical sections are, according to a suitable embodiment, provided at one end with means for engagement with a locking mechanism in the rocket launcher, in a manner corresponding to that discussed above in another dispenser type.

BRIEF DESCRIPTION OF THE DRAWINGS

The invention will be described in greater detail below by means of illustrative embodiments with reference to accompanying drawings, in which:

FIG. 1 shows a previously known rocket launcher carried by an aircraft;

FIG. 2 shows the rocket launcher according to FIG. 1 with its nose portion and tail portion removed;

FIG. 3 shows diagrammatically an example of a rocket launcher and a dispenser arrangement according to the invention, and FIG. 4 shows another example of a dispenser arrangement according to the invention.

DETAILED DESCRIPTION OF EMBODIMENTS OF THE INVENTION

The known rocket launcher 1 shown in FIG. 1 comprises a circular cylindrical main body 2 with a nose portion 3 and a tail portion 4. On the lateral surface of the main body 2, there are mounting means 5, 6 in the form of eyes or the like for engagement with gripping means (not shown) on a load-carrying aircraft. Also present on the lateral surface of the main body 2 are contact means 7, 8 for connection in an electrical and/or other suitable manner between the rocket launcher 1 and the aircraft, so that the functioning of the rocket launcher can be controlled in a suitable manner from the aircraft.

Before or in conjunction with the first activation of the rocket launcher, the nose portion 3 is removed. FIG. 2 shows the rocket launcher with its nose portion and tail portion removed. A number of rocket tubes 9 are accommodated behind the nose portion and in the main body 2 of the rocket launcher. In the example according to FIG. 2, seven rocket tubes are accommodated, namely a central tube 9.1 and six surrounding tubes 9.2-9.7. In a known basic embodiment, all seven rocket tubes each accommodate a rocket.

FIG. 3 shows a rocket launcher 1 according to the invention with a dispenser arrangement 10 according to the invention. The rocket launcher has seven rocket tubes 9.1-9.7 positioned in the manner shown in FIG. 2. The dispenser arrangement comprises a common section 11 located in the main in the central tube 9.1 and six surrounding sections 12 located in the main in the six surrounding tubes 9.2-9.7. Two of the six surrounding sections are visible in FIG. 3 and have been designated by 12.2 and 12.5. The six surrounding sections 12 can be of identical construction, but can also have different construction in order to take different types of ammunition. The central section 11 is held together with the surrounding sections 12 by a coupling arrangement (not shown in greater detail) adjacent to the openings 13 of the rocket tubes 9.1-9.7.

The six surrounding sections 12 contain countermeasure ammunition 17 in the form of flat packs 17.1-17.n and an ammunition-advancing device 18 of suitable type, for example some form of spring-loading.

The discharging mechanism of the dispenser arrangement comprises an ammunition-separating device 14 which is mounted essentially in the central tube 9.1 and is common to the surrounding sections 12. A common drive mechanism 15 located in the central tube 9.1 belongs to the discharging mechanism. The drive mechanism drives a push rod 16 which can rotate in a plane parallel to the opening plane of the rocket tubes.

In principle, the dispenser arrangement functions by virtue of the ammunition-advancing devices 18 in the surrounding sections 12 pressing the countermeasure ammunition 17 contained towards the front part of the sections 12. In the front part of the sections, there is an opening 19 in each surrounding section 12, through which one flat pack 17.1-17.n can pass at a time. Arrows 20 and 21 show examples of the discharging direction of the packs. In order to pass out through the opening 19, the pack directly in front of the opening is pushed out by means of the push rod 16 which is driven from the central section 11. The push can be brought about by virtue of the push rod rotating parallel to the opening plane of the rocket tubes. Alternatively, reciprocating push rods can be incorporated.

The rocket launcher and the dispenser arrangement described with reference to FIG. 3 have been assumed to comprise seven sections located in the manner indicated. However, there is nothing to prevent designs with either more or fewer sections. For example, the central section 11 can be surrounded by two layers of sections. It is also possible to replace the common section 11 with several sections, where each section is assigned a number of sections with countermeasure ammunition.

FIG. 4 shows an example of a complete dispenser arrangement 23 intended to be accommodated in a rocket tube 9.1-9.7 of a rocket launcher 1. The dispenser arrangement 23 comprises an oblong casing 24 with an open end 25 and a closed end 26. Adjacent to the closed end, there is a drive motor 27 connected to a piston 28. In front of the piston is the countermeasure ammunition 30 in the form of flat packs 30.1-30.n. Mounted in the front part of the casing 24 is a release mechanism 29 which allows the packs 30.1-30.n to pass through under certain conditions. For example, the release mechanism can open when the pressure from the piston 28 passes a suitable limit value.

A circumferential groove 31 is formed in the rear part of the dispenser arrangement. The groove is adapted to interact with a locking mechanism in the rocket launcher. In a simple embodiment, the locking mechanism consists of a spring 32 with a raised portion 33 intended to interact with the groove 31.

The packs can contain radar chaff, for example in the form of metal-coated glass fibres or the like, which, when the pack is opened during flight, forms chaff clouds for the purpose of diverting enemy radar equipment. In order to divert heat-seeking equipment, use can be made of packs of what is known as hot chaff. When the pack is opened in connection with leaving the dispenser arrangement, a chemical process begins, which brings about heating of the chaff.

In the dispenser arrangements described above, the packs 17.1-17.n and 30.1-30.n of countermeasure ammunition can be released one by one or in showers as defined by a preprogrammed computer program, a dispenser sequence transmitted in real time by means of a data link or a hardware-controlled mechanism.

The invention is not limited to the embodiments shown above by way of example but can undergo modifications within the scope of the patent claims below.

The invention claimed is:

1. A dispenser arrangement for discharging countermeasure ammunition, the dispenser arrangement comprising:
   a plurality of countermeasure sections configured to be accommodated and secured in spaces for rockets in a rocket launcher, each countermeasure section comprising a casing having a cylindrical lateral outer surface including a space configured to simultaneously accommodate a plurality of countermeasure ammunition, a first end comprising a lateral opening in the cylindrical lateral outer surface of the casing for discharging the plurality of countermeasure ammunition in a lateral direction with respect to the cylindrical lateral outer surface casing, and an ammunition-advancing device configured to advance the plurality of countermeasure ammunition through the countermeasure section toward the lateral opening, and
   a discharging mechanism comprising an ammunition-separating device configured to discharge the plurality of countermeasure ammunition from the countermeasure sections through the lateral openings.

2. The dispenser arrangement according to claim 1, further comprising:
   a common section configured to be accommodated and secured in a space for rockets in a rocket launcher such that the countermeasure sections are arranged around the common section; and
   a coupling arrangement coupling the common section to the countermeasure sections.

3. The dispenser arrangement according to claim 1, wherein each countermeasure section comprises a cylindrical lateral surface that substantially coincides with a cylindrical lateral inner surface of the spaces for rockets of the rocket launcher.

4. The dispenser arrangement according to claim 1, wherein the plurality of countermeasure ammunition comprises radar chaff or heatgenerating bodies.

5. The dispenser arrangement according to claim 1, wherein the ammunition-separating device is common to a plurality of the countermeasure sections.

6. The dispenser arrangement according to claim 5, wherein the common ammunition-separating device is arranged in the common section.

* * * * *

UNITED STATES PATENT AND TRADEMARK OFFICE
CERTIFICATE OF CORRECTION

PATENT NO. : 7,600,477 B2  Page 1 of 1
APPLICATION NO. : 10/476757
DATED : October 13, 2009
INVENTOR(S) : Christer Zätterqvist It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Fifth Day of October, 2010

David J. Kappos
*Director of the United States Patent and Trademark Office*